(12) United States Patent
Stevens

(10) Patent No.: US 7,117,951 B2
(45) Date of Patent: Oct. 10, 2006

(54) LANDSCAPE PREPARATION APPARATUS

(76) Inventor: Timothy J. Stevens, 145 8th St. SW., Buffalo, MN (US) 55313

(*) Notice: Subject to any disclaimer, the term of this patent is extended or adjusted under 35 U.S.C. 154(b) by 0 days.

(21) Appl. No.: 10/851,031

(22) Filed: May 21, 2004

(65) Prior Publication Data

US 2004/0221999 A1 Nov. 11, 2004

Related U.S. Application Data

(63) Continuation-in-part of application No. 10/230,014, filed on Aug. 28, 2002, now abandoned.

(51) Int. Cl.
*A01D 13/00* (2006.01)
(52) U.S. Cl. .................... 171/105; 171/135
(58) Field of Classification Search .......... 171/111, 171/135, 104, 105, 107, 1
See application file for complete search history.

(56) References Cited

U.S. PATENT DOCUMENTS

| | | | | |
|---|---|---|---|---|
| 3,461,968 A | * | 8/1969 | Longley | 171/132 |
| 3,765,490 A | * | 10/1973 | Logue | 171/132 |
| 3,878,952 A | * | 4/1975 | Hueftle | 414/697 |
| 4,014,390 A | * | 3/1977 | Teixeira | 171/124 |
| 4,297,073 A | * | 10/1981 | Schmid et al. | 414/704 |
| 4,669,947 A | * | 6/1987 | Frost | 414/724 |
| 4,698,150 A | * | 10/1987 | Wigoda | 209/421 |
| 5,553,408 A | * | 9/1996 | Townsend | 37/406 |
| 5,564,506 A | * | 10/1996 | Foster et al. | 171/63 |
| 5,630,476 A | * | 5/1997 | Foster et al. | 171/63 |
| 5,682,953 A | * | 11/1997 | Buysse | 171/63 |
| 5,743,030 A | * | 4/1998 | Sirr | 37/406 |
| 6,074,160 A | * | 6/2000 | Brumbaugh et al. | 414/704 |

* cited by examiner

*Primary Examiner*—Christopher J. Novosad
(74) *Attorney, Agent, or Firm*—Craig Gregersen

(57) ABSTRACT

Apparatus for raking and cleaning topsoil of undesired materials has a frame supporting a scoop and a rake or comb of multiple tines on a shaft that is rotatable about the shaft's longitudinal axis. Rotation of the shaft can then be used to raise or lower the rake into a raking or combing engagement with the top soil. The scoop is also rotatably supported to allow it to be activated to accumulate undesirable materials. Hydraulic cylinders or equivalent apparatus are provided to activate alternately the rake or scoop as desired by the operator.

18 Claims, 4 Drawing Sheets

LANDSCAPE PREPARATION APPARATUS

This is a continuation-in-part application claiming priority from U.S. patent application Ser. No. 10/230,014, filed Aug. 28, 2002, now abandoned and entitled "Landscape Preparation Apparatus."

The present invention relates generally to apparatus and method useful for conditioning, smoothing, and landscaping soil and particularly to an apparatus and method that enables the user to smooth the ground surface and to rake or comb the surface to remove undesired materials such as rocks and sticks.

BACKGROUND OF THE INVENTION

Conditioning or preparing the surface of the ground before landscaping is almost necessary. Often, particularly at new construction sites, the top layer of soil is mixed with undesirable materials such as rocks or large sticks. These undesirable materials must be removed to provide the typically desired, smoothly contoured surface before grass and other foliage is planted. Usually, this work is performed with hand labor and it can be a labor intensive process using rakes and shovels to separate and then pick up the undesirable material. The undesirable materials are often buried under one or more inches of loose top soil, resulting in the need for great effort to unearth these undesirable materials and to remove them. Indeed, a site often appears to be ready to be landscaped only to have a rain occur that reveals much such undesirable material that had been buried under the top layer of soil.

In part because the supply of available labor to perform these landscape preparation tasks fluctuates and is often in short supply and/or expensive, those businesses involved in landscaping have both a need and a desire to be able to perform such conditioning with mechanized equipment rather than hand labor.

None of the presently available mechanized tools quickly and easily removes debris from a site, however. Many of the tools, particularly those that are attached to power sources such as tractors, however, are not well suited to work in confined areas. One piece of equipment used on many landscaping sites is the skid-steer loader. These loaders are capable of being maneuvered in small areas and of moving heavy loads. Some attachments have been made for this type of equipment, but none are capable of raking a landscaping site while also being able to pick up and remove the undesired materials. Thus, separate attachments are required by those using such machines to perform various aspects of a landscape preparation job.

It would be desirable to have a tool or piece of equipment that was capable of raking or combing the upper soil layer to remove undesired materials such as rocks, sticks, construction debris such as, for example, boards, insulation, or siding, or other undesirable materials from the area to be landscaped and that was also capable of being used to remove the undesired materials from the site as well as to clean it.

BRIEF DESCRIPTION OF THE INVENTION

It is an object of the present invention to provide new and useful apparatus that is not subject to the previously mentioned disadvantages.

It is another object of the present invention to provide apparatus useful for raking or combing the ground surface to separate undesired material from the topsoil.

It is still another object of the present invention to provide a apparatus useful for raking or combing the ground surface to separate undesired material from the topsoil and then to scoop up such undesired material for removal to a remote location.

The foregoing objects of the present invention are provided by a landscape preparation apparatus including a frame supporting a rake or comb of multiple tines on a shaft that is rotatable about the shaft's longitudinal axis. Rotation of the shaft can then be used to raise or lower the rake into a raking or combing engagement with the top soil. The frame can take the form of a bucket with an inner scoop that is mounted for rotation on a shaft to raise or lower the inner scoop as desired. Lowering the inner scoop allows the scoop to be used to accumulate undesirable materials. In one embodiment of the present invention the rake and the inner scoop are both attached to the same power source so that when the rake is rotated into a ground engaging position the inner scoop is rotated away from a ground or material accumulating position. Similarly, rotation of the rake away from a ground engaging position will cause the inner scoop to be rotated into a ground engaging position. In the embodiment illustrated, the inner scoop can have solid side walls and a screen-like structure forming the rear and bottom walls, thereby allowing material smaller than the screen apertures to pass therethrough while retaining the larger, undesirable pieces therein. Alternatively, the inner scoop can have solid rear and bottom walls also.

Thus, the present invention provides an apparatus and method useful for cleaning up a site wherein a raking tool and a scooping tool are alternately and selectively activated by an operator to rake or gather debris or other undesirable materials such as construction materials from the soil and to subsequently pick the materials up with the scooping tool and remove them from the site.

In a method in accord with the present invention an apparatus is providing with a raking tool and a scooping tool, each tool having an operational and a non-operational position. The raking tool is disposed in its operational position and the scooping tool in its non-operational position and the raking tool is moved through the soil at a desired depth to gather debris and undesirable materials within the soil. The scooping tool is then disposed in its operational position; and accumulates the gathered debris and undesirable materials therein for removal from the site. In another aspect of the present invention, disposing one of the tools is in its operational position disposes the other tool is in its non-operational position.

These and other objects, advantages, and features of an embodiment of the present invention will be appreciated by those skilled in the art when the following drawings are considered in conjunction with the accompanying text description.

DETAILED DESCRIPTION OF THE INVENTION

Figure 1:
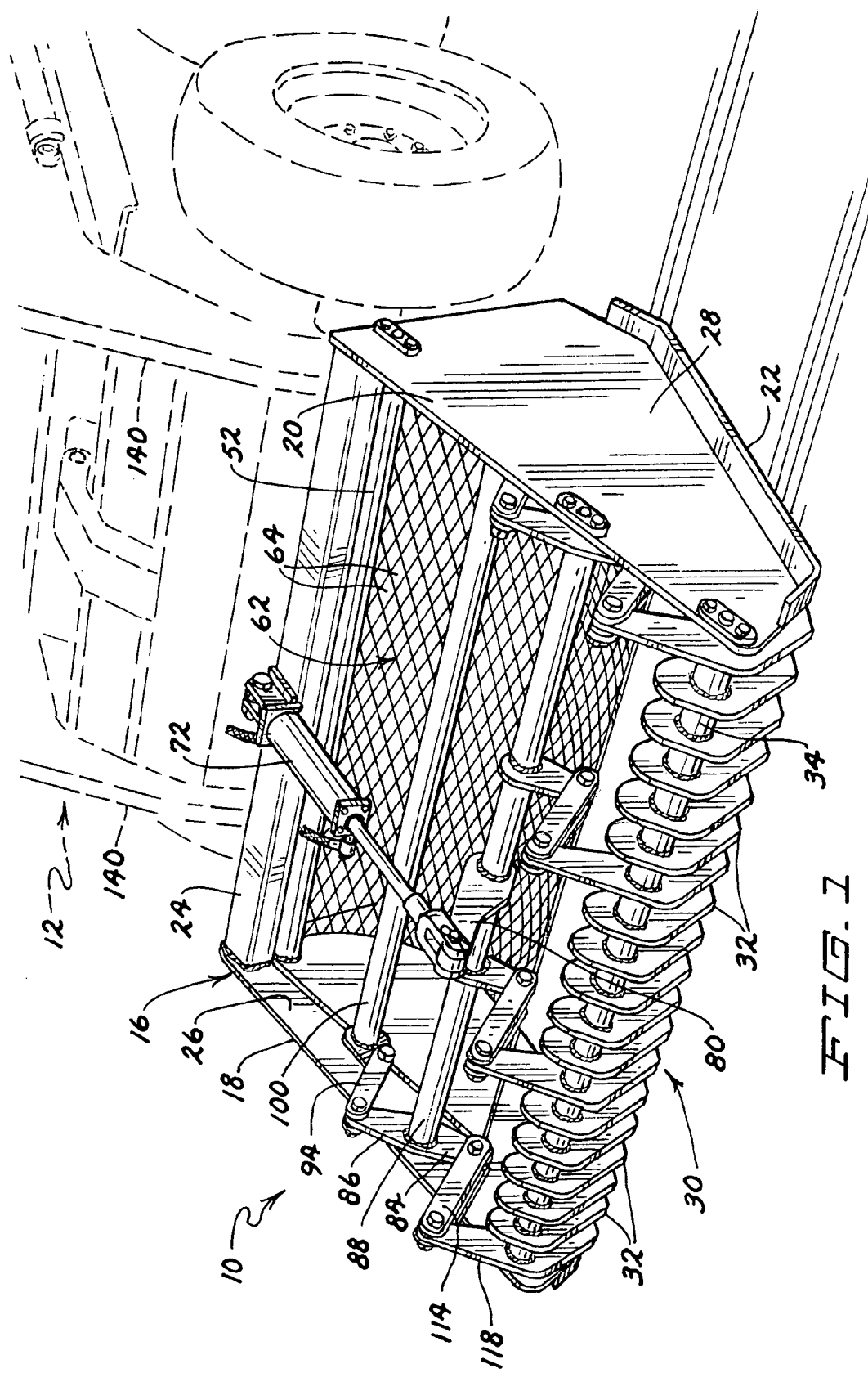
FIG. 1 is a perspective illustration of an embodiment of the present invention shown attached to a skid-steer loader shown in phantom.

An embodiment of a landscape preparation apparatus 10 in accord with the present invention will be hereafter described with reference to FIGS. 1–7. Landscape preparation apparatus 10 is shown attached to a skid steer loader 12 (shown in phantom outline) using a common attachment bracket 14 (shown in phantom outline) of the type typically used for such attachments. Landscape preparation apparatus 10 could also be mounted to other equipment, such as a standard farm tractor with its three point hitch or other kinds of equipment and its use is not limited to the skid-steer loader exemplarily shown here. The attachment bracket 14, therefore, may take on other configurations for attachment to other equipment.

Landscape preparation apparatus 10 includes a frame 16 taking the general form of a bucket 18 commonly mounted to loaders 12. That is, the frame 16 includes a pair of side walls 20. The frame side walls 20 as shown may have a substantially plate-like, planar configuration with a thickness substantially less than its width and height. Each side wall 20 may have, if desired, a skid plate 20 attached thereto along the lower, ground engaging side of the side wall 20. Skid plates 22 substantially prevent the frame 16 or bucket 18 from digging into the ground. The side walls 22 are supported by support members 24 that extend therebetween the inner surfaces 26 thereof. The skid plates 22 extend outwardly from the outer surfaces 28 of the side walls 20. Unlike typical buckets, however, bucket 18 does not include a solid bottom or rearward wall structure to contain materials therein. In particular, the bucket 18 includes a gap 29 between the side walls 20 near the bottom rear side to allow materials to pass through the landscape preparation apparatus 10.

Figure 2:
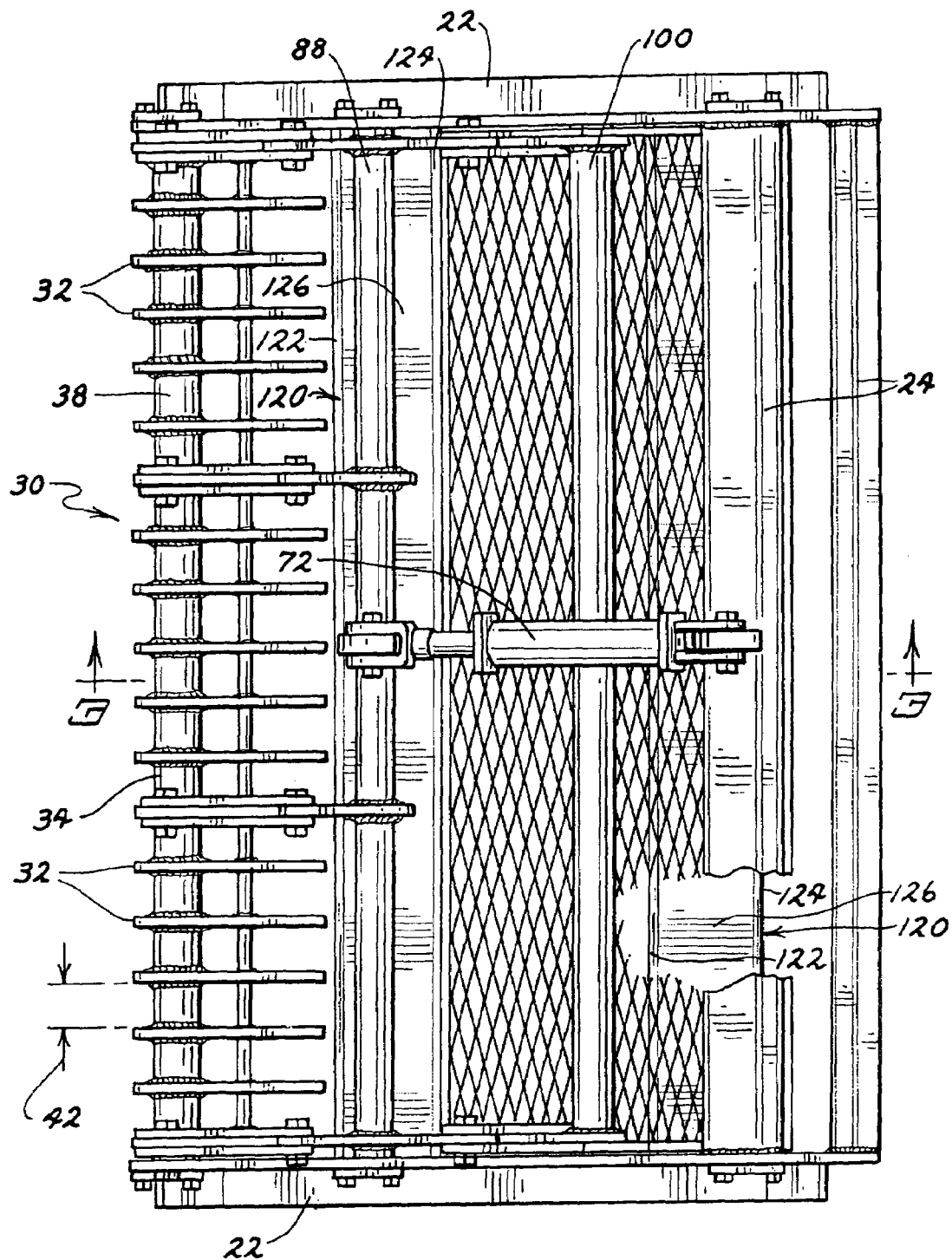
FIG. 2 shows the embodiment of FIG. 1 in a top plan view.
Figure 3:
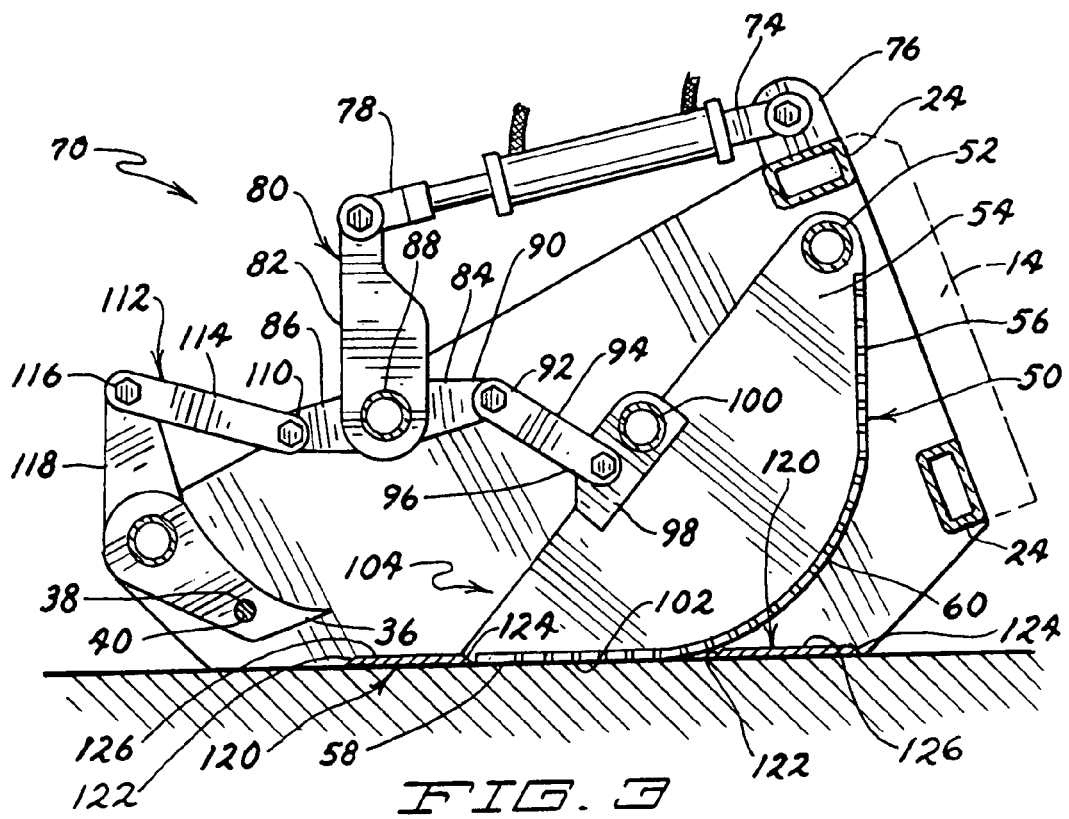
FIG. 3 is a side elevation, cross sectional view of the present invention taken along viewing plane 3—3 of FIG. 2 and showing the rake in a first operative position.
Figure 4:
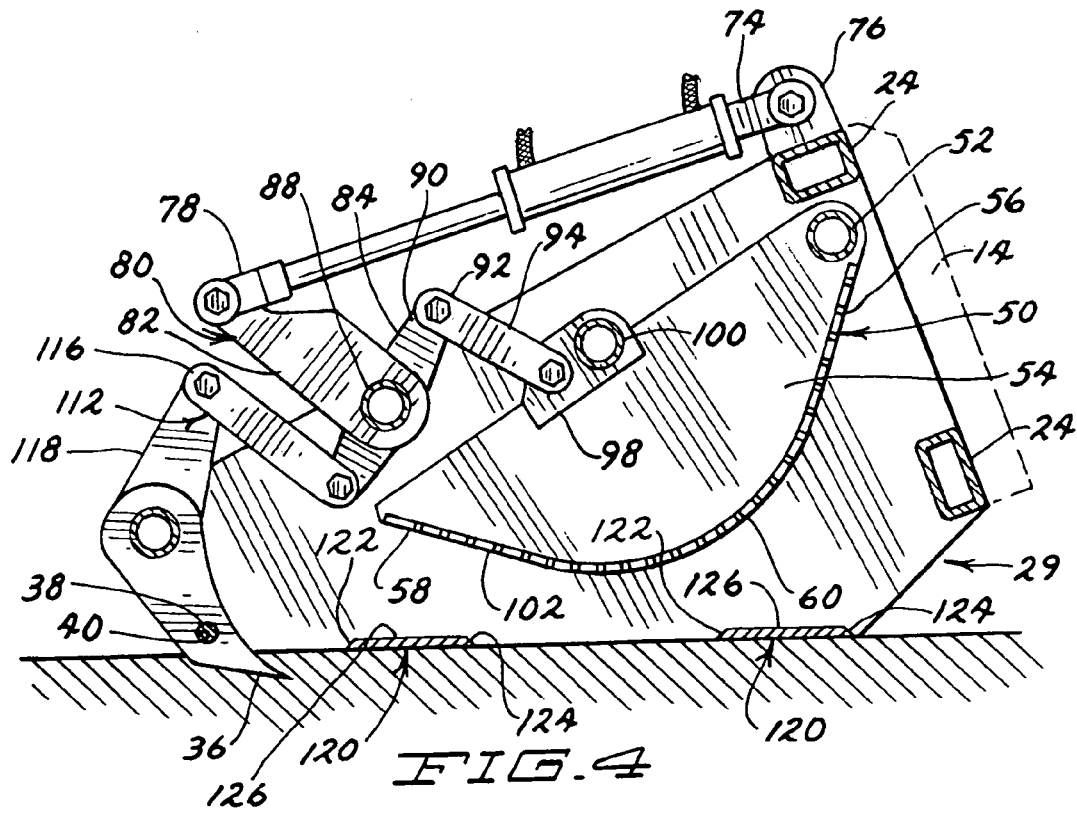
FIG. 4 is a side elevation, cross sectional view of the present invention showing the rake in a second operative position.

Mounted at the forward end of the bucket 18 is a rake or comb 30. Rake 30 comprises a plurality of teeth or tines 32 mounted to a shaft 34. Shaft 34 is rotationally mounted at its ends to the side walls 20. Each of the tines 32 includes a tine end 36, which is capable of engaging the ground as seen in FIG. 4. The tine ends 36 may be supported by a support member 38, comprising a longitudinally extending solid shaft in the present embodiment, that extends through a hole 40 in each tine 32. As best seen in FIGS. 3 and 4, the rake 30 may be disposed in a non-operative position and an operative position, respectively, by rotating the rake. Such rotation may be accomplished by a linkage mechanism to be described further below. Adjacent tines 32 are separated by a gap 42 (FIG. 2) that may be sized as desired for particular soil cleaning operations. Tines 32, when placed in an operational position will break up, that is, crush or pulverize, clumps of dirt or clods. Clods that resist reduction in size will be pushed or pulled by the tines 32 depending upon the direction of operation of the apparatus into piles for removal or further processing. Smaller clods will pass between the tines. The tines will also push or pull any other material such as sticks or rocks or other debris too large to pass through the gap 42.

Bucket 18 also mounts a scoop 50. Scoop 50 is mounted for rotation relative to bucket 18 by a shaft 52 mounted at its ends to the interior surface 26 of the side walls 20. Scoop 50 includes a pair of side walls 54 mounted so as to lie substantially parallel to bucket side walls 18 and which are attached to the shaft 52. The side walls 54 as shown, have a substantially triangular configuration, with the rear and bottom sides 56 and 58, respectively, merging in a smoothly configured corner 60 (FIG. 3).

Extending between the side walls 54 of scoop 50 is a screen member 62. Screen member 62 as shown is attached to the rear and side sides 56 and 58, respectively, of the side walls 54. As shown, screen member 62 is a one-piece construction, but if desired, multiple pieces could be used. Screen member 62 includes screening apertures 64 of a desired size and configuration to allow material to be screened as desired. Also, if desired, member 62 could be manufactured as a solid piece without any screening apertures 64. As shown, the side walls 54 are configured to be of solid material, though they also could be made of a material having a screen-like structure if desired.

The activation apparatus 70 for the rake 30 and the scoop 50 will now be described. It will be understood that while the present embodiment advantageously uses a single mechanism to activate both the rake 30 and the scoop 50, those skilled in the art will appreciate that separate mechanisms similar to that described here could also be used to separately activate them.

Apparatus 70 includes an hydraulic cylinder 72 pivotally attached at one end to the bucket 18. More specifically, in the embodiment shown in the Figures, the end 74 of the cylinder 72 is attached to an upwardly extending member 76, which is in turn attached to the support member 24 of bucket 18. The other, extensible end 78, that is, the cylinder piston, is attached to a rocker arm 80. Rocker 80 comprises a rocker arm member 82 to which the cylinder end 78 is attached and a pair of outwardly extending scoop rocker arm member 84 and rake rocker arm member 86. The rocker arm 80 is attached to a rocker arm shaft 88 that is rotationally attached at its ends to the inner surfaces 26 of the bucket side walls 20. Thus, comparing FIGS. 2 and 3, it will be observed that extending the piston 78 will cause the first rocker arm member 82 to pivot forwardly about its attachment to rocker arm shaft 88. This will in turn cause the rocker arm shaft 88 to rotate counterclockwise about its longitudinal axis and cause the scoop and rake rocker arm members 84 and 86, respectively, to rotate counterclockwise about their attachments to the rocker arm shaft 88 also.

Scoop rocker arm member 84 is pivotally attached at its free end 90 to an end 92 of a scoop linking arm 94. The other end 96 of scoop linking arm 94 is pivotally attached to an attachment member 98, which is rigidly attached to a scoop lift arm 100 that is attached at its ends to the scoop side walls 54.

Comparing FIGS. 3 and 4 again, it will be seen that when the cylinder piston is retracted, the scoop 50 is in its lowered or operative position with its bottom surface 102 engaging the ground surface. As the piston is extended, the scoop rocker arm is pivoted such that the end 90 thereof is elevated relative to the ground. This elevation of end 90 in turn causes the attached arm 94 to be raised and thereby lifting the scoop off the ground and disposing it in its upper or non-operative position 104.

The rake rocker arm member 86 is pivotally attached at its free end 110 to an end 112 of a rake linking arm 114. The other end 116 of the rake linking arm is pivotally attached to the upwardly extending attachment ears 118 of a plurality of tines 32. As seen in FIGS. 1 and 2, four tines are used with such extended attachment ears 118, though more or less could be used as required to provided the desired strength and length of life. As seen in the Figures, the two end tines and two evenly space intermediate tines include such ears 118.

Comparing FIGS. 3 and 4 again, it will be seen that when the cylinder piston is retracted, the rake 30 is in its raised or non-operative position. As the cylinder piston is extended, the rocker arm 80 pivots forwardly about rocker arm shaft 88, causing the free end 110 of rake rocker arm member 86 to pivot downwardly and rearwardly. This pivoting action of the rake rocker arm member 84 pulls the rake linking arm 114 rearwardly, in turn pulling the rake attachment ears 118 rearwardly and causing the rake shaft 34 to rotate in a clockwise direction as viewed in FIGS. 3 and 4. This rotation in turn causes the tines to rotate in a clockwise direction and into the ground as seen in FIG. 4.

A landscape preparation apparatus 10 may also include one or more cutting bars 120, best seen in FIGS. 2–4. Each bar 120 may have a forward and a rear beveled or cutting edge 122, 124, respectively, separated by a center section 126. The center section 126 may have a dimension in the forward-rearward direction as desired. The cutting bars 120 function to strengthen the frame 16 as well as to remove inconsistencies in the height of the soil or area being worked. As seen in FIG. 3, when the scoop 50 is in its operational position, the front edge 128 of the scoop 50 will preferably lie snugly against the rear cutting edge 124 of a forwardly placed cutting bar 120. When the apparatus 10 is used in this position and operated in a forwardly moving direction, the forward cutting bar 120 will level off the area being worked and will lift the soil removed and force it directly into the scoop.

Figure 5:
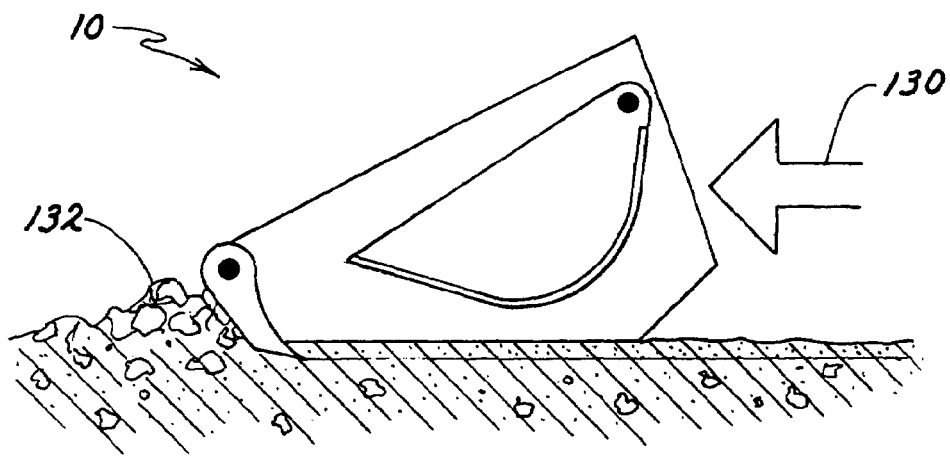
FIG. 5 shows the embodiment of FIG. 1 in a schematic, side elevation, operational view wherein the bucket is being pushed forward with the rake teeth extended downwardly to rake the soil and push oversized, undesirable materials ahead of it.
Figure 6:
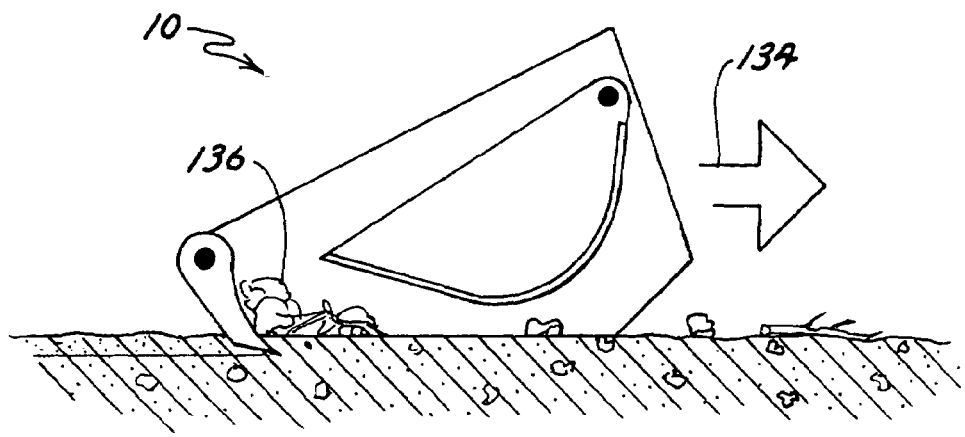
FIG. 6 shows the embodiment of FIG. 1 in a schematic, side elevation, operational view wherein the bucket is being pulled rearwardly with the rake teeth extended downwardly to rake the soil and pull oversized, undesirable material backwards with it.
Figure 7:
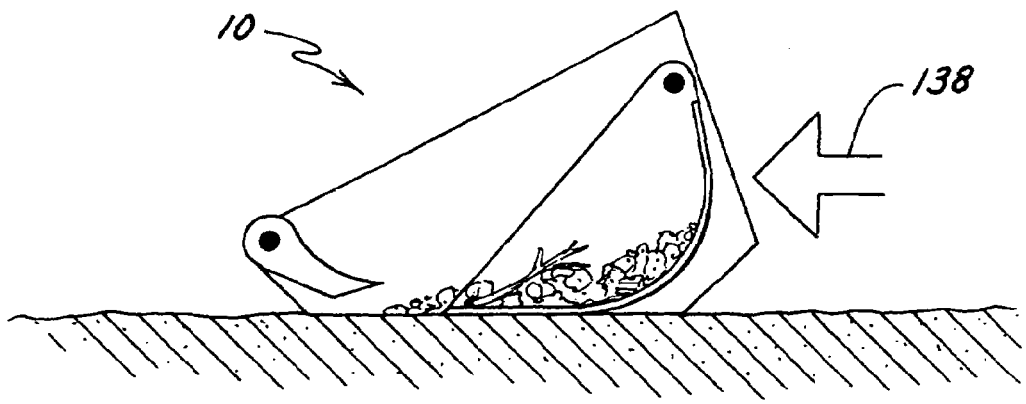
FIG. 7 shows the embodiment of FIG. 1 in a schematic, side elevation, operational view wherein the bucket is being pushed forward with the teeth elevated and with the screen lowered to scoop the oversized, undesirable materials while passing smaller material through the screen.

Referring now to FIGS. 5–7, operation of the present invention will be described. As seen in FIG. 5, the landscape preparation apparatus 10 is being pushed forwardly as indicated by the arrow 130. The scoop 50 has been raised into its non-operative position while the tines 32 have been rotated into an operative position wherein they are digging into the ground. The depth of penetration can be controlled by the degree of extension of the cylinder piston 78. In this position, materials larger than the gap 42 between adjacent tines are pushed forwardly of the landscape preparation apparatus 10, as indicated by the gathering material pile 132. This material pile 132 may consist of dirt clods that resist pulverization into smaller clumps, rocks, sticks, construction materials, and other debris or materials unwanted in a landscaped area. Smaller items pass through the gap between the adjacent tines 32, underneath the scoop 50, and out of the landscape preparation apparatus 10 through the open gap 29 at the back of the landscape preparation apparatus.

In FIG. 6, the direction of motion is reversed from that of FIG. 5, with the landscape preparation apparatus 10 now being pulled rearwardly as indicated by the arrow 134. The rake 30 is still in the operative position and the scoop 50 is in its in-operative position. As the landscape preparation apparatus 10 is pulled rearwardly, material will enter the landscape preparation apparatus 10 through the gap 29 at the back of the landscape preparation apparatus. The rake 30 will capture materials too large to pass through the gap 42 between adjacent tines. That is, such materials will be caught by the rake and pulled rearwardly, thus creating an accumulating material pile 136 of unwanted material like that previously described above inside the landscape preparation apparatus 10. Smaller objects will pass through the gaps 42 and out of the landscape preparation apparatus. In this manner, then, the landscape preparation apparatus 10 can be used in either a forward (FIG. 5) or reverse (FIG. 6) direction to clean the soil.

Referring now to FIG. 7, once the desired amount of raking or combing of the soil has been accomplished, the rake 30 can be raised to its inoperative position, thus lowering the scoop 50 to its operative position. The landscape preparation apparatus 10 can then be pushed forward as indicated by arrow 138 to scoop the debris pile—132 or 136—into the scoop 50. Once again, the landscape preparation apparatus 10 will perform a cleaning or sorting operation as materials too large to pass through the screen apertures 64 are retrained within the scoop 50 and smaller materials are allowed to pass through the apertures 64 back onto the ground, thereby sifting the soil to remove dirt clods and other undesirable materials having a size larger than the apertures. At any point in time, the landscape preparation apparatus 10 can be raised by the loader 12 operator by raising the loader's arms 140 and the material can be transported and dumped in a specified area. Once again, it will be understood that the present invention can be attached to other equipment such as farm tractors or the like.

The apparatus 10 thus mechanizes landscape preparation that may otherwise require manual labor because of its ability to rake, separate, and collect using a single piece of equipment and moving it in a forward/reverse direction as previously described. The rake 30 can reduce clod sizes and separate large, undesirable material from the terrain while the scoop 50 can be used to remove such materials from a site or take it to another location for further processing. One or more cutting bars 120 can be used to aid in the leveling of the site.

In addition to functioning as a topsoil conditioner, landscape preparation apparatus 10 can also perform the functions of a traditional bucket. That is, it the operative position illustrated in FIGS. 3 and 7 the landscape preparation apparatus 10 can be pushed or pulled along the ground using the bottom surface 102 of the scoop 50 and the cutting bars 120 to smooth the ground surface as well as to pick up and transport materials from one location to another.

The present invention having thus been described, other modifications, alterations, or substitutions may now suggest themselves to those skilled in the art, all of which are within the spirit and scope of the present invention. By way of example only, other mechanisms could be used in lieu of hydraulic cylinder 72, such as an air cylinder, linear actuator, or other known mechanical or electrical actuators. Additionally, landscape preparation apparatus 10 could be attached to other motive power sources such as a farm tractor as previously mentioned or other any device deemed suitable or equivalent thereto by those skilled in the art. Also, the present invention has been illustrated herein with an embodiment wherein a mechanical linkage is used to alternately dispose the rake and the bucket in their operating positions. However, other known forms of providing motion, such individually actuated hydraulic cylinders or linear actuators or other devices known to the art could be used to alternately place the rake and scooping tools in their operational and non-operational positions and thus the physical linkage between them as shown herein could be obviated. It is therefore intended that the present invention be limited only by the scope of the attached claims below.

What is claimed is:

1. A landscape preparation apparatus for mounting to the manipulator arms of a vehicle, said landscape apparatus comprising:
   a frame positionable in a ground engaging position and a non-ground engaging position, said frame comprising a pair of side walls in spaced apart relation, each said side wall having a substantially, planar configuration with a thickness substantially less than each said side wall's height and width;
   a rake supported by said frame and movable between operational and non-operational positions relative to said frame and the ground when said frame is in a ground engaging position; and
   a scoop supported by said frame and movable between operational and non-operational positions relative to said frame and the ground when said apparatus is in a ground engaging position,
wherein said rake and scoop are alternately movable between their respective operational and non-operational positions.

2. The landscape preparation apparatus of claim 1 wherein said frame comprises a pair of frame side walls supported in spaced-apart relation.

3. The landscape preparation apparatus of claim 2 wherein said rake and said scoop are supported between said frame side walls.

4. The landscape preparation apparatus of claim 3 wherein said rake comprises a plurality of tines supported by a rake shaft, said rake shaft being supported by said frame side walls.

5. The landscape preparation apparatus of claim 4 wherein said rake shaft is rotatably supported by said frame side walls.

6. The landscape preparation apparatus of claim 5 wherein when said apparatus is in the ground engaging position said tines are rotatable between the operative position where said tines engage the ground and the inoperative position where said tines do not engage the ground.

7. The landscape preparation apparatus of claim 2 wherein said scoop comprises a pair of side walls, a rear wall and a bottom wall.

8. The landscape preparation apparatus of claim 7 wherein said scoop rear wall includes a plurality of screening apertures.

9. The landscape preparation apparatus of claim 7 wherein said scoop bottom wall includes a plurality of screening apertures.

10. The landscape preparation apparatus of claim 9 wherein said scoop rear wall includes a plurality of screening apertures.

11. The landscape preparation apparatus of claim 1 and further including at least one cutting bar supported by said frame, said cutting bar including at least one cutting edge.

12. The landscape preparation apparatus of claim 11 wherein said at least one cutting bar includes forward and rear cutting edges and said at least one cutting bar is supported between said frame side walls.

13. The landscape preparation apparatus of claim 11 and further including a pair of cutting bars, each cutting bar having forward and rear cutting edges, wherein said frame comprises a pair of frame side walls supported in spaced-apart relation, and said cutting bars are supported between said frame side walls.

14. The landscape preparation apparatus of claim 13 wherein said cutting bars comprise a forward cutting bar disposed between said rake and said scoop and a rear cutting bar disposed behind said scoop.

15. The landscape preparation apparatus of claim 14 wherein said scoop includes a scoop front edge and said forward cutting bar is disposed relative to said scoop such that said scoop front edge lies against said rear cutting edge of said forward cutting bar.

16. The landscape preparation apparatus of claim 1 wherein said rake includes a plurality of tines with adjacent tines separated by a gap.

17. The landscape preparation apparatus of claim 1 and further including means for rotating said rake and said scoop between operative and inoperative positions.

18. The apparatus of claim 1 wherein said scoop and said rake are operatively linked to each other such that when said rake is disposed in said rake's operational position said scoop is disposed in said scoop's non-operational position and when said scoop is disposed in said scoop's operational position said rake is disposed in said rake's non-operational position.

* * * * *